United States Patent Office 2,829,979
Patented Apr. 8, 1958

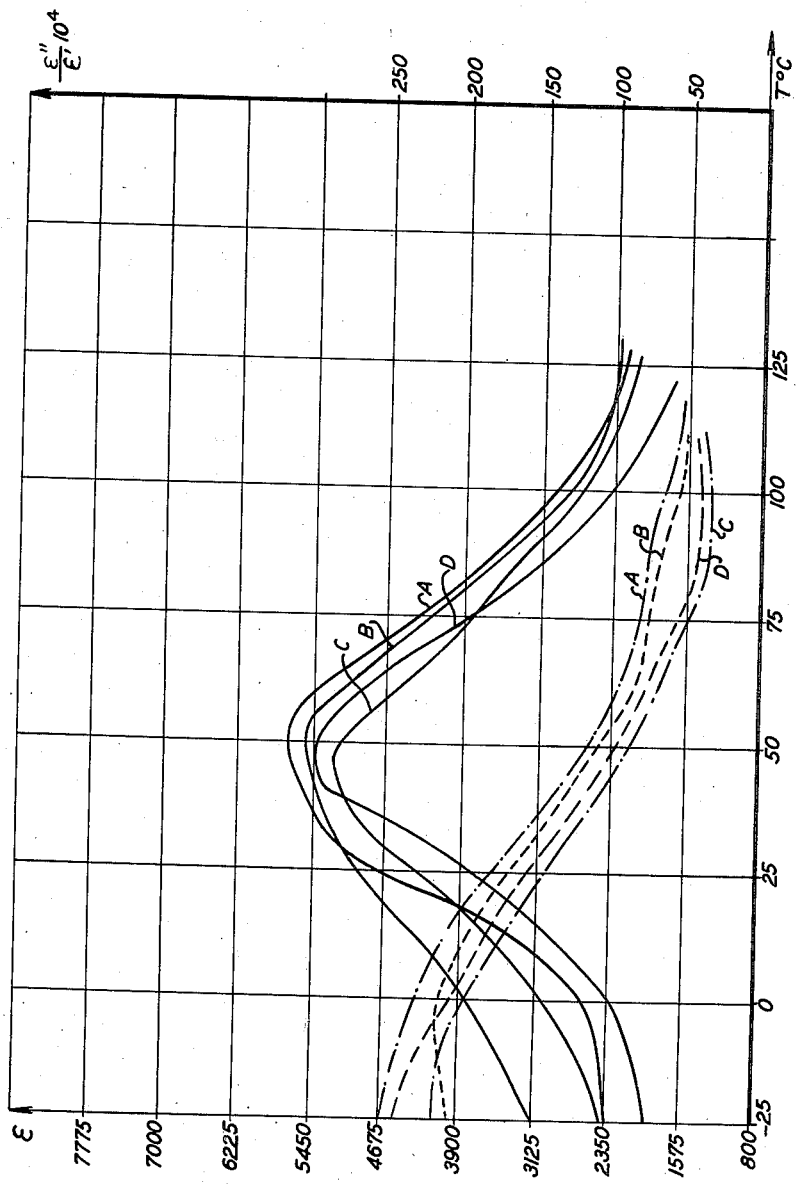

2,829,979

CERAMIC PIECES OF HIGH DIELECTRIC CONSTANT AND PROCESS OF THEIR MANUFACTURE

Micheline Calis, Paris, France, assignor to Compagnie Generale de Telegraphie Sans Fil, a corporation Application January 12, 1954, Serial No. 403,578

Claims priority, application France January 15, 1953

22 Claims. (Cl. 106—46)

The present invention relates to ceramic dielectric materials having a high dielectric constant and more particularly to materials having a crystalline lattice of the perovskite type.

There are known materials of this type having a dielectric constant of the order of some thousands. These are compounds of metallic oxides of the fourth group of the periodic classification of elements (Ti, Zr, Sn) with oxides of metals of the second group (Ca, Ba, Sr).

Such materials, prepared in accordance with methods well known in ceramic technics, are in general compositions composed in major part of barium titanate but this latter has a high power factor and moreover its dielectric constant varies by more than 100% as a function of temperature, which prevents the use of this material as capacitor dielectric.

According to the United States Patent No. 2,520,376, filed on May 22, 1948, in the name of R. R. Roup et al., it is known to add predetermined amounts of lanthanum oxide $La_2O_3$ to barium titanate.

Experience shows that by addition of $La_2O_3$ the dielectric constant is rendered a maximum about 45° C., i. e. within the range of temperature of use. Unfortunately the power factor remains of the order of 500 to 600.10$^{-4}$, which is not permissable in a great number of applications.

The object of the present invention is to provide a dense ceramic material whose dielectric constant is a maximum about 45° C. and whose power factor is of the order of about 150.10$^{-4}$ at normal use temperature and which becomes less than 80.10$^{-4}$ above 50° C.

According to the invention this result is obtained by adding to barium titanate predetermined amounts of lanthanum oxide and, of lead oxide PbO or germanium oxide $GeO_2$.

According to the invention, the amounts are as follows: for 100 g. of $BaTiO_3$, which is previously fired and crushed, there is added 0.5 to 10 g. of $La_2O_3$ and 0.1 to 0.3 g. of at least one of the oxides PbO and $GeO_2$. The preferred amount of $La_2O_3$ is from 1 to 2 g. and particularly 2 g. for 100 g. of barium titanate.

The material according to the invention is prepared according to well-known methods.

According to one of these methods there is prepared an equimolar mixture of finely powdered titanium oxide $TiO_2$ and barium carbonate. Barium oxide may be used instead of barium carbonate, but it is difficult to keep it in pure state on account of its affinity for carbon dioxide and water vapour of the air, so that the resultant carbonates and hydrates would interfere with exact proportioning of the components.

For well-known technological reasons it is advisable that the excess of $TiO_2$ be not greater than 2% of the equimolar mixture of $TiO_2$ with the barium carbonate. This mixture is agglomerated and fired to a temperature between 1200° C. and 1400° C. The said fired material is crushed, ground and sifted through 200 mesh per centimeter. There is thereby obtained a powder of barium titanate which is suitable for use according to the present invention. This powder is mixed with lanthanum oxide $La_2O_3$ and lead oxide PbO and/or germanium oxide $GeO_2$.

This mixture may for example be effected in the presence of water in porcelain ball grinders. The dough obtained is dried, sifted and mixed, as well known in the art, with an organic binder such as an organic soap or a gel formed from ceresine wax and terpineol, or the like which enables the mixture obtained to be formed by casting or extruding under pressure or, to be used for obtaining thin plates, according to known methods; such methods have been described in the United States Patent No. 2,446,872, filed on December 4, 1941, in the name of R. W. Ehlers. Objects thereby obtained are subjected to a second firing at a temperature between 1200° C. and 1400° C.

It is necessary to ensure that no reducing action occurs in the course of the baking as this might produce conductive or semi-conductive phases within the mass of the material. This is obtained, according to usual practice, for instance, by providing a good ventilation of the oven.

Owing to the fact that the barium titanate was fired before its mixture with lanthanum oxide and lead oxide or germanium oxide, shrinkage in the course of the second firing is but slight and in any case predictable as a function of the maximum temperatures of the two firing operations. Nevertheless, the product obtained is dense, since the lanthanum oxide and lead oxide or germanium oxide favor the formation of a vitreous phase and probably enter into solid solution in the composition.

There are indicated hereunder two preferred examples of the mixture according to the invention:

|  | Grams |
|---|---|
| (a) $BaTiO_3$ (previously fired to 1300° C.) | 100 |
| $La_2O_3$ | 2 |
| PbO | 0.1 |
| (b) $BaTiO_3$ (previously fired to 1300° C.) | 100 |
| $La_2O_3$ | 2 |
| $GeO_2$ | 0.1 |

In both above instances the mixture is obtained in the manner indicated above, the final firing of the material being effected in the region of 1350° C. There is obtained a dense ceramic material, having a dielectric constant of about 5500 which varies by less than ±20% between −20° and +60° C. and possessing the big advantage of having always its dielectric constant maximum at a temperature of about 45° C., the power factor being less than 150.10$^{-4}$ at 1 kilohertz.

The material obtained is of low manufacturing price and may be used in the manufacture of capacitors.

In the accompanying graph there has been shown, as a function of the temperature T, the variation in the dielectric constant $\epsilon$ (in full line), and the variation in the power factor $$\frac{\epsilon''}{\epsilon'}$$

(in dotted line) of four examples of the products according to the invention which have the same percentage of $La_2O_3$ and different respective percentages of PbO or $GeO_2$.

These four compositions and the corresponding curves are designated A, B, C and D. The respective proportions of these compositions are as follows:

Composition A:

|  | Grams |
|---|---|
| $TiO_3Ba$ | 100 |
| $La_2O_3$ | 2 |
| PbO | 0.1 |

| Composition B: | Grams |
|---|---|
| TiO$_3$Ba | 100 |
| La$_2$O$_3$ | 2 |
| GeO$_2$ | 0.1 |
| Composition C: | |
| TiO$_3$Ba | 100 |
| La$_2$O$_3$ | 2 |
| GeO$_2$ | 0.2 |
| Composition D: | |
| TiO$_3$Ba | 100 |
| La$_2$O$_3$ | 2 |
| PbO | 0.25 |

A typical example of a complete process in accordance with the teachings of the invention is as follows: A substantially equimolar mixture of powdered titanium dioxide and powdered barium carbonate is prepared. The mixture is fired to a temperature between 1200° and 1400° C. and then crushed to a powder. To this powder is added 100 parts by weight of barium titanate, 0.5 to 10 parts by weight of lanthanum oxide and 0.1 to 0.3 part by weight of PbO or GeO$_2$. An organic binder such as a gel formed from ceresive wax is added to form a paste which is fired at a temperature of from 1200–1400° C.

What I claim is:

1. Process for making a dense ceramic dielectric product, affording a high dielectric constant, varying relatively little with temperature between −20° and +60° C. and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 0.5 to 10 parts of lanthanum oxide and 0.1 to 0.3 part of at least one oxide selected from the group consisting of PbO and GeO$_2$, incorporating an organic binder to convert the mixture to a paste, forming the said paste and firing the same to a temperature between 1200 to 1400° C.

2. Process for making a dense ceramic dielectric product, affording a high dielectric constant, varying relatively little with temperature between −20° and +60° C. and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 1 to 2 parts of lanthanum oxide and 0.1 to 0.3 part of at least one oxide selected from the group consisting of PbO and GeO$_2$, incorporating an organic binder to convert the mixture to a paste, forming the said paste and firing the same to a temperature between 1200 to 1400° C.

3. Process for making a dense ceramic dielectric product, affording a high dielectric constant, varying relatively little with temperature between −20° and +60° C. and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 2 parts of lanthanum oxide and 0.1 to 0.3 part of at least one oxide selected from the group consisting of PbO and GeO$_2$, incorporating an organic binder to convert the mixture to a paste, forming the said paste and firing the same to a temperature between 1200 to 1400° C.

4. Process for making a dense ceramic dielectric product, affording a high dielectric constant, varying relatively little with temperature between −20° and +60° C. and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 0.5 to 10 parts of lanthanum oxide and 0.1 to 0.3 part of lead oxide PbO, incorporating an organic binder to convert the mixture to a paste, forming the said paste and firing the same to a temperature between 1200 to 1400° C.

5. Process for making a dense ceramic dielectric product, affording a high dielectric constant, varying relatively little with temperature between −20° and +60° C., and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 0.5 to 10 parts of lanthanum oxide and 0.1 to 0.3 part of germanium oxide GeO$_2$, incorporating an organic binder to convert the mixture to a paste, forming the said paste and firing the same to a temperature between 1200 to 1400° C.

6. Process for making a dense ceramic dielectric product, affording a high dielectric constant, varying relatively little with temperature between −20° and +60° C., and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 1 to 2 parts of lanthanum oxide and 0.1 to 0.3 part of lead oxide PbO, incorporating an organic binder to convert the mixture to a paste, forming the said paste and firing the same to a temperature between 1200 to 1400° C.

7. Process for making a dense ceramic dielectric product, affording a high dielectric constant, varying relatively little with temperature between −20° and +60° C. and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate 1 to 2 parts of lanthanum oxide and 0.1 to 0.3 part of germanium oxide GeO$_2$, incorporating an organic binder to convert the mixture to a paste, forming the said paste and firing the same to a temperature between 1200 to 1400° C.

8. Process for making a dense ceramic dielectric product, affording a high dielectric constant, varying relatively little with temperature between −20° and +60° C., and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 2 parts of lanthanum oxide and 0.1 to 0.3 part of lead oxide PbO, incorporating an organic binder to convert the mixture to a paste, forming the said paste and firing the same to a temperature between 1200 to 1400° C.

9. Process for making a dense ceramic dielectric product, affording a high dielectric constant, varying relatively little with temperature between −20° and +60° C., and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate 2 parts of lanthanum oxide and 0.1 to 0.3 part of germanium oxide $GeO_2$, incorporating an organic binder to convert the mixture to a paste, forming the said paste and baking the same to a temperature between 1200 to 1400° C.

10. Process for making a dense ceramic dielectric product, affording a high dielectric constant, varying relatively little with temperature between —20° and +60° C. and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 2 parts of lanthanum oxide and 0.1 part of germanium oxide $GeO_2$, incorporating an organic binder to convert the mixture to a paste, forming the said paste and firing the same to a temperature at about 1350° C.

11. Process for making a dense ceramic dielectric product affording a high dielectric constant, varying relatively little with temperature between —20° and +60° C., and being maximum at about 45° C., which comprises the steps of: making a substantially equimolar mixture of powdered titanium dioxide and powdered barium carbonate, firing said mixture to a temperature between 1200° and 1400° C., crushing the fired product to a powder, mixing therewith by weight for 100 parts of barium titanate, 2 parts of lanthanum oxide and 0.1 part of lead oxide PbO, incorporating an organic binder to convert the mixture to a paste, forming the said paste and firing the same to a temperature at about 1350° C.

12. Dense ceramic dielectric product consisting essentially of 100 parts by weight of $BaTiO_3$, 0.5 to 10 parts of $La_2O_3$ and 0.1 to 0.3 part of at least one oxide selected from the group consisting of PbO and $GeO_2$.

13. Dense ceramic dielectric product consisting essentially of 100 parts by weight of $BaTiO_3$, 1 to 2 parts of $La_2O_3$ and 0.1 to 0.3 part of at least one oxide selected from the group consisting of PbO and $GeO_2$.

14. Dense ceramic dielectric product consisting essentially of 100 parts by weight of $BaTiO_3$, 2 parts of $La_2O_3$ and 0.1 to 0.3 part of at least one oxide selected from the group consisting of oxides PbO and $GeO_2$.

15. Dense ceramic dielectric product consisting essentially of 100 parts by weight of $BaTiO_3$, 0.5 to 10 parts of $La_2O_3$ and 0.1 to 0.3 part of lead oxide PbO.

16. Dense ceramic dielectric product consisting essentially of 100 parts by weight of $BaTiO_3$, 1 to 2 parts of $La_2O_3$ and 0.1 to 0.3 part of lead oxide PbO.

17. Dense ceramic dielectric product consisting essentially of 100 parts by weight of $BaTiO_3$, 2 parts of $La_2O_3$ and 0.1 to 0.3 part of lead oxide PbO.

18. Dense ceramic dielectric product consisting essentially of 100 parts by weight of $BaTiO_3$, 0.5 to 10 parts of $La_2O_3$ and 0.1 to 0.3 part of germanium oxide $GeO_2$.

19. Dense ceramic dielectric product consisting essentially of 100 parts by weight of $BaTiO_3$, 1 to 2 parts of $La_2O_3$ and 0.1 to 0.3 part of germanium oxide $GeO_2$.

20. Dense ceramic dielectric product consisting essentially of 100 parts by weight of $BaTiO_3$, 2 parts of $La_2O_3$ and 0.1 to 0.3 part of germanium oxide $GeO_2$.

21. Dense ceramic dielectric product consisting essentially of 100 parts by weight of $BaTiO_3$, 2 parts of $La_2O_3$, and 0.1 part of lead oxide PbO.

22. Dense ceramic dielectric product consisting essentially of 100 parts by weight of $BaTiO_3$, 2 parts of $La_2O_3$, and 0.1 part of germanium oxide $GeO_2$.

References Cited in the file of this patent
UNITED STATES PATENTS

| | | |
|---|---|---|
| 2,520,376 | Roup et al. | Aug. 29, 1950 |
| 2,643,192 | Jonker et al. | June 23, 1953 |

FOREIGN PATENTS

| | | |
|---|---|---|
| 574,577 | Great Britain | Jan. 11, 1946 |